J. A. MILLER.
AUXILIARY AIR INLET VALVE.
APPLICATION FILED JULY 16, 1912.
1,064,360. Patented June 10, 1913.
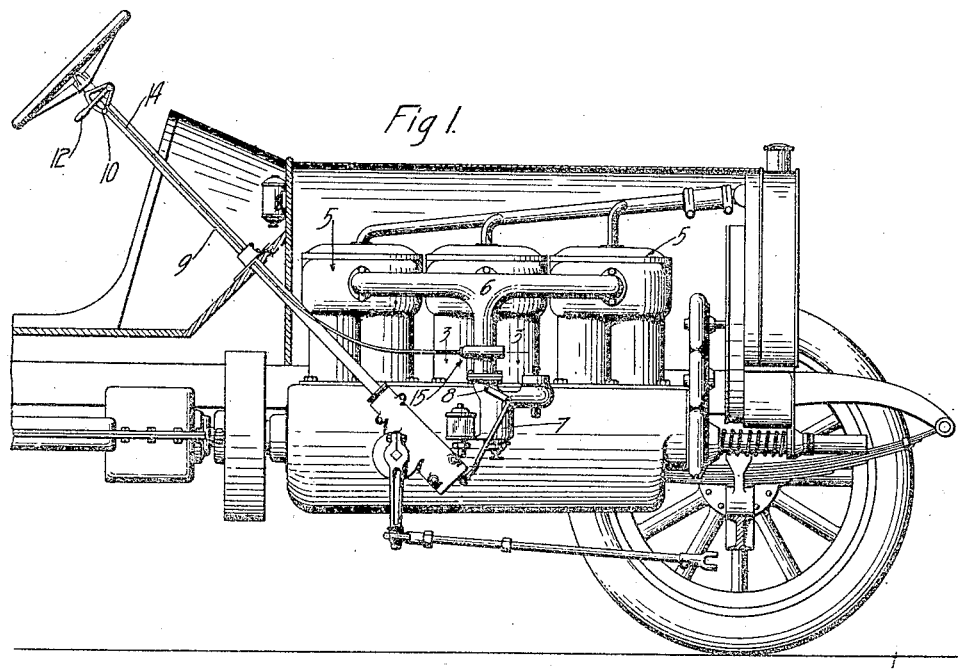
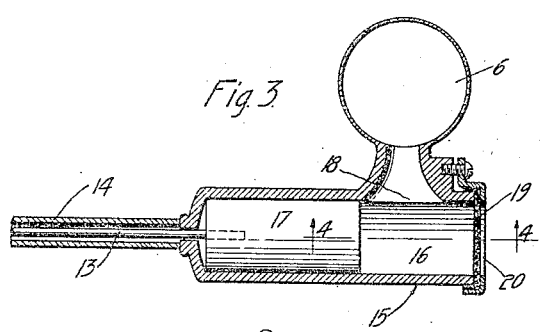
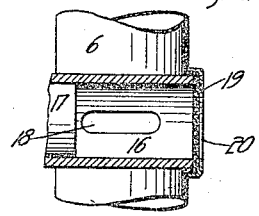
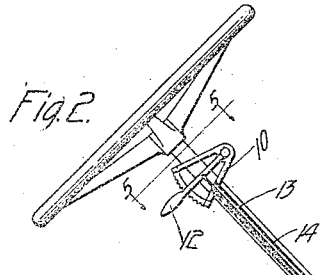
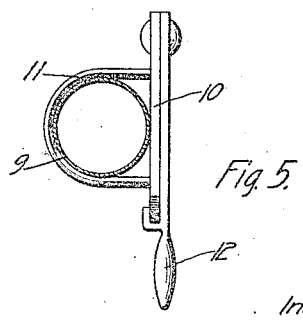
Witnesses
Inventor
John A. Miller

UNITED STATES PATENT OFFICE.

JOHN A. MILLER, OF LOS ANGELES, CALIFORNIA, ASSIGNOR TO MOTOR CAR EQUIPMENT REPAIRS COMPANY, INC., OF LOS ANGELES, CALIFORNIA.

AUXILIARY AIR-INLET VALVE.

1,064,360.   Specification of Letters Patent.   Patented June 10, 1913.

Application filed July 16, 1912. Serial No. 709,746.

*To all whom it may concern:*

Be it known that I, JOHN A. MILLER, a citizen of the United States, residing at Los Angeles, county of Los Angeles, State of California, have invented new and useful Improvements in Auxiliary Air-Inlet Valves, of which the following is a specification.

This invention relates to a device for supplying automobile engines with auxiliary air independent of the carbureter action; and the invention has to do particularly with a simple and efficient device whereby a graduated amount of air may be admitted to the engine cylinders so as to supply to those cylinders a proper mixture for the most perfect combustion.

In its most approved form, my invention embodies a sliding piston valve combination on the engine intake pipe, preferably directly above the carburetor, a Bowden wire through the medium of which the piston is operated, and a sector and lever device on the steering post directly under the steering wheel, the arrangement being such that a movement of the lever will move the piston of the valve longitudinally to open and close the port admitting air into the intake pipe. These features will become more readily apparent in the following specification, taken in connection with the accompanying drawings, in which;

Figure 1 is a general elevation showing the application of my improved auxiliary air valve to an automobile. Fig. 2 is a detail elevation of the parts of the apparatus mounted on the automobile steering post. Fig. 3 is a cross section taken as indicated by line 3—3 of Fig. 1 and illustrating in detail the piston valve and its connections to the intake pipe. Fig. 4 is a section taken on line 4—4 of Fig. 3. Fig. 5 is an enlarged sectional detail showing the sector and lever mounted on the steering post, said section taken as indicated by line 5—5 of Fig. 2.

In the drawings 5 designates the engine of any typical automobile, 6 the intake pipe thereof, 7 the carbureter, 8 the throttle valve on the carbureter, and 9 the steering post of the automobile. Attached directly to the steering post 9 I have shown a suitable sector 10, preferably attached to the steering post by any suitable clamp 11. Over this sector a small hand lever 12 is adapted to be operated. A Bowden wire 13 connects directly with the lever and extends through a flexible casing 14 to the auxiliary air valve 15. This auxiliary air valve comprises an open ended cylinder 16 in which a piston valve 17 is adapted to be reciprocated by the longitudinal movement of the wire 13. The piston in its travel is adapted to cover and uncover an elongate port 18, this port leading directly to the interior of the intake pipe 6. The valve cylinder 16 is mounted directly on the intake pipe as is shown in the drawings. The air inlet to cylinder 16 is at the open end of the cylinder, this end of the cylinder being provided with a suitable screen 19 held in place by a suitable ring 20, and making the entire end of the cylinder open in the manner specified and controlling the amount of air admitted only at one point—the valve covered port—conduces to a thorough mixture in that the air is freely admitted in any quantity desired.

The port 18 being comparatively long, it is seen that the movement of the valve piston will accurately control the amount of auxiliary air admitted to the intake pipe. The piston also being long, and fitting tightly in the cylinder, prevents any air leaking around it to its rear end; and when the piston is in position to cover the port the engine suction holds the piston tightly against its seat around the port to prevent any air leakage into the intake pipe. No dust or foreign matter can enter the cylinder or the intake pipe, screen 19 cleaning the air of dust or other objectionable matter. The relation of the dust screen to the cylinder and piston and the inlet port is important. With the screen at the point where the air first enters the apparatus there is no possibility of dust working into the cylinder and piston and wearing them out. It will also be seen that the operation of the auxiliary valve is simple and easy, the lever 12 being merely pulled upwardly to allow air to enter the intake pipe, and being pushed downwardly to cut off that air. When the automobile engine is first started the auxiliary valve remains closed; after the engine has warmed up and is operating under normal conditions, the auxiliary air valve is opened slightly to increase the amount of air fed to the cylinders. This has the effect of keeping the combustible mixture always at its most efficient proportions.

Having described my invention, I claim;

1. In a device of the character described, an auxiliary air valve comprising a cylinder open at one end and mounted upon an engine intake pipe, there being a port leading from the interior of the cylinder to the interior of the intake pipe, said port being relatively long in a direction parallel to the axis of the cylinder and being relatively narrow in a direction transverse to the axis of the cylinder, a screen over the open end of the cylinder, a piston slidable in said cylinder and adapted to cover and uncover the said port therein, and manually operable means to move said piston longitudinally of the cylinder.

2. In a device of the character described, an auxiliary air valve comprising a cylinder open at one end and mounted upon an engine intake pipe, there being a port leading from the interior of the cylinder near its open end to the interior of the intake pipe, a dust screen over the open end of the cylinder, a piston in the cylinder movable to the end thereof opposite the screened end to uncover the port and open the space in the cylinder directly between the screened end and the port, and means for reciprocating the piston, all substantially as described.

In witness that I claim the foregoing I have hereunto subscribed my name this 9th day of July, 1912.

JOHN A. MILLER.

Witnesses:
 ELWOOD H. BARKELEW,
 L. E. RICHARDSON.